(12) United States Patent
Xiang et al.

(10) Patent No.: US 10,931,392 B2
(45) Date of Patent: Feb. 23, 2021

(54) SERVICE PROCESSING METHOD AND APPARATUS

(71) Applicant: HUAWEI TECHNOLOGIES CO., LTD., Shenzhen (CN)

(72) Inventors: Junling Xiang, Chengdu (CN); Limin Dong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/572,737

(22) Filed: Sep. 17, 2019

(65) Prior Publication Data
US 2020/0014480 A1 Jan. 9, 2020

Related U.S. Application Data

(63) Continuation of application No. PCT/CN2018/077406, filed on Feb. 27, 2018.

(30) Foreign Application Priority Data

Mar. 21, 2017 (CN) .......................... 201710171276.X

(51) Int. Cl.
  *H04J 3/16* (2006.01)
  *H04L 12/931* (2013.01)

(52) U.S. Cl.
  CPC .............. *H04J 3/167* (2013.01); *H04L 49/20* (2013.01)

(58) Field of Classification Search
  CPC ........ H04J 3/167; H04J 3/1647; H04J 3/1658; H04L 49/20; H04W 28/0263; H04W 72/0446
  See application file for complete search history.

(56) References Cited

U.S. PATENT DOCUMENTS

| 6,411,613 B1 | 6/2002 | Seymour et al. |
| 2010/0209107 A1 | 8/2010 | Yin |
| 2012/0057870 A1 | 3/2012 | Dong et al. |
| 2016/0119075 A1 | 4/2016 | Gareau et al. |

(Continued)

FOREIGN PATENT DOCUMENTS

| CN | 1250280 A | 4/2000 |
| CN | 101489157 A | 7/2009 |

(Continued)

OTHER PUBLICATIONS

Hussain et al., "GMPLS Routing and Signaling Framework for Flexible Ethernet (FlexE) draft-izh-ccamp-flexe-fwk-00", Internet Engineering Task Force, Oct. 20, 2016, total 20 pages.

(Continued)

*Primary Examiner* — Afshawn M Towfighi
(74) *Attorney, Agent, or Firm* — Maier & Maier, PLLC

(57) ABSTRACT

Embodiments provide a service processing method and apparatus. According to the service processing method, a number of code blocks of a client service may be mapped to a FlexE subslot, and a FlexE subslot overhead is generated, so that the client service mapped to the FlexE subslot and the FlexE subslot overhead are sent through a physical channel, and a low-rate service is carried. Compared with carrying a low-rate service by directly using an entire FlexE slot, carrying the client service by using a number of FlexE subslots into which the FlexE slot is divided can improve bandwidth utilization.

17 Claims, 7 Drawing Sheets

(56) References Cited

U.S. PATENT DOCUMENTS

2016/0119076 A1    4/2016    Gareau
2018/0145928 A1*    5/2018    Zhong ................. H04L 47/2491
2018/0159785 A1*    6/2018    Wu ......................... H04L 47/38

FOREIGN PATENT DOCUMENTS

| CN | 101615967 A | 12/2009 |
|---|---|---|
| CN | 101753249 A | 6/2010 |
| CN | 106357421 A | 1/2017 |
| CN | 106411454 A | 2/2017 |
| EP | 1306985 A1 | 5/2003 |

OTHER PUBLICATIONS

"IA OIF-FLEXE-01.0 Flex Ethernet Implementation Agreement", Optical Internetworking Forum, Mar. 2016, total 31 pages.

* cited by examiner

SERVICE PROCESSING METHOD AND APPARATUS

CROSS-REFERENCE TO RELATED APPLICATIONS

This application is a continuation of International Application No. PCT/CN2018/077406, filed on Feb. 27, 2018, which claims priority to Chinese Patent Application No. 201710171276.X, filed on Mar. 21, 2017, the disclosures of the aforementioned applications are hereby incorporated by reference in their entireties.

FIELD

This application relates to the field of communications technologies, and in particular, to a service processing method and apparatus.

BACKGROUND

As communications technologies develop, an Ethernet transfer rate has developed from 10M, 100M, 1 G, and 10 G to 40 G and 100 G nowadays, and current 40 G Ethernet and 100 G Ethernet have been widely applied. In addition, the Optical Internetworking Forum (OIF) of the International Organization for Standardization is extending an application scenario of Ethernet, and it is expected that a service rate and an Ethernet standard interface rate can be completely decoupled, which is referred to as flexible Ethernet (FlexE), to enhance flexibility of Ethernet application.

However, in current FlexE, a 5G slot is divided, and a problem of carrying low-rate services such as GE and ODU1 is not considered. A 1.25 G GE signal is carried in a 5 G slot, resulting in excessively low bandwidth utilization.

SUMMARY

Embodiments provide a service processing method and apparatus, to carry a low-rate service and improve bandwidth utilization.

According to a first aspect, an embodiment provides a service processing method. The service processing method may include: obtaining a client service, where the client service has a number of code blocks; mapping the number of code blocks of the client service to a flexible Ethernet (FlexE) subslot, where the FlexE subslot is obtained from at least two FlexE subslots into which a FlexE slot is divided; generating a FlexE subslot overhead, where the FlexE subslot overhead includes a quantity of FlexE subslots and information about the client service carried in the FlexE subslot; sending, through at least one physical channel, the client service mapped to the FlexE subslot and the FlexE subslot overhead; and allocating bandwidth of the FlexE slot to the at least two FlexE subslots.

In this implementation, a low-rate client service may be mapped, through slot division, to the subslots obtained by dividing the FlexE slot, and compared with directly mapping a low-rate client service to the FlexE slot, bandwidth utilization can be improved.

In a possible implementation, the FlexE slot may include N code blocks, the N code blocks include a first code block and a second code block, the at least two FlexE subslots include a first subslot and a second subslot, the first code block is allocated to the first subslot, and the second code block is allocated to the second subslot. The first code block and the second code block are code blocks of different client services, and the first subslot and the second subslot are two subslots obtained by dividing one FlexE slot.

In a possible implementation, the quantity of FlexE subslots may be obtained based on a ratio of the bandwidth of the FlexE slot to bandwidth of the FlexE subslot. In an optional implementation, bandwidth of a subslot may be predetermined, and then a quantity of subslots is determined. Optionally, a quantity of subslots that are to be obtained through division is determined based on a bandwidth requirement of the client service. Assuming that the bandwidth requirement of the client service is 2.5 G and bandwidth of each FlexE slot is 5 G, the FlexE slot may be divided into two subslots. Optionally, or alternatively, the quantity of subslots may be predetermined, and then the bandwidth of the subslot is determined. For example, a FlexE slot needs to be divided into two subslots, and bandwidth of each subslot is a half of bandwidth of the FlexE slot. When one FlexE slot is divided into two subslots, and bandwidth of the FlexE slot cannot be evenly divided, a remaining location of the FlexE slot that cannot be evenly divided may not participate in slot division.

In a possible implementation, the information about the client service includes a service type and/or a service identifier of the client service. A subslot overhead may be indicated by using a slot overhead field in an overhead frame, for example, Calendar A.

For example, on a 100 GE physical channel, one overhead block is inserted every 1023*20 blocks, and eight consecutive inserted overhead blocks form one overhead frame. One overhead frame includes one slot overhead field used to indicate service information carried in one of the 20 consecutive slots, and in this embodiment, one slot is divided into at least two subslots. Therefore, at least two overhead frames are required to completely indicate subslot overheads of the at least two subslots. For example, in a first overhead frame, in a slot overhead field corresponding to a slot that is divided into subslots, a subslot overhead of a first subslot is set; and in a second overhead frame, in the slot overhead field corresponding to the slot that is divided into the subslots, a subslot overhead of a second subslot is set. Therefore, a quantity of multiframe periods for completely sending generated FlexE subslot overheads is identical to a quantity of subslots obtained through division.

In a possible implementation, a slot information switch request (CR) is sent to a receive end, where the CR is used to indicate that the FlexE slot switches from a first quantity of FlexE subslots to a second quantity of FlexE subslots; and a slot information switch acknowledgment message CA returned by the receive end is received, where the CA is used to indicate that the FlexE slot can switch from the first quantity of FlexE subslots to the second quantity of FlexE subslots. A transmit end may place subslot overheads of the second quantity of FlexE subslots in a candidate slot overhead field for indication. Therefore, after receiving the CA sent by the receive end, the transmit end may change a switch value of a currently used slot overhead field in an overhead frame, that is, after triggering C-bit overhead switch, the transmit end may send information about the C-bit overhead switch to the receive end. The C-bit is used to indicate that the receive end parses, in a next multiframe period, the client service based on the subslot overheads placed in the candidate slot overhead field. The next multiframe period is a subsequent multiframe period after subslot overheads of the first quantity of FlexE subslots are completely sent. According to this implementation, a flexible change in the quantity of subslots is implemented by performing three handshakes by using the CR and the CA.

Therefore, the service processing method can support a flexible change in service bandwidth.

According to a second aspect, an embodiment further provides a service processing method. The service processing method includes: receiving a block stream sent through at least one physical channel, and identifying a flexible Ethernet FlexE overhead block in the block stream; extracting a FlexE subslot overhead from the FlexE overhead block, where the FlexE subslot overhead includes a quantity of FlexE subslots and information about a client service carried in the FlexE subslot; and obtaining a number of code blocks of the client service from the FlexE subslot based on the subslot overhead, where the FlexE subslot is obtained from at least two FlexE subslots into which a FlexE slot is divided. For example, before a transmission device identifies the flexible Ethernet FlexE overhead block in the block stream, the method further includes: after receiving the block stream from the at least one physical channel, first delimiting, aligning, and re-arranging, by the transmission device, 66B blocks in the block stream to restore a correct stream of 66B blocks; and aligning channels of data by identifying the determined FlexE overhead block. According to this implementation, low-rate service data can be parsed out from the FlexE subslot based on the FlexE subslot overhead in a slot overhead field.

In a possible implementation, the number of code blocks include a first code block and a second code block, the at least two FlexE subslot includes a first subslot and a second subslot, the first subslot carries the first code block, and the second subslot carries the second code block. The first code block is a code block of the client service carried in the first subslot, and the second code block is a code block of the client service carried in the second subslot.

In a possible implementation, the quantity of FlexE subslots is obtained based on a ratio of the bandwidth of the FlexE slot to bandwidth of the FlexE subslot.

In a possible implementation, the information about the client service includes a service type and/or a service identifier of the client service.

In a possible implementation, a slot information switch request CR sent by a transmit end is received, where the CR is used to indicate that the FlexE slot switches from a first quantity of FlexE subslots to a second quantity of FlexE subslots; and a slot information switch acknowledgment message CA is sent to the transmit end, where the CA is used to indicate that the FlexE slot can switch from the first quantity of FlexE subslots to the second quantity of FlexE subslots.

According to a third aspect, an embodiment further provides a service processing apparatus. The service processing apparatus is configured to implement steps in the service processing method according to the first aspect. The foregoing steps may be implemented by using hardware, or may be implemented by using hardware by executing corresponding software. The hardware or the software includes one or more modules corresponding to the foregoing steps. For example, the service processing apparatus may include an obtaining module, a mapping module, a generation module, and a sending module.

According to a fourth aspect, an embodiment further provides a service processing apparatus. The service processing apparatus is configured to implement steps in the service processing method according to the second aspect. The foregoing steps may be implemented by using hardware, or may be implemented by using hardware by executing corresponding software. The hardware or the software includes one or more modules corresponding to the foregoing steps. For example, the service processing apparatus may include a receiving module, an extraction module, and an obtaining module.

According to a fifth aspect, an embodiment further provides a transmit end. The transmit end may include a processor, a memory, and a communications interface. The processor is connected to the communications interface and the memory. The memory is configured to store a program instruction. The processor is configured to invoke the program instruction in the memory, to perform the service processing method according to the first aspect of the embodiments.

According to a sixth aspect, an embodiment further provides a receive end. The receive end may include a processor, a memory, and a communications interface. The processor is connected to the communications interface and the memory. The memory is configured to store a program instruction. The processor is configured to invoke the program instruction in the memory, to perform the service processing method according to the second aspect of the embodiments.

BRIEF DESCRIPTION OF DRAWINGS

To describe the technical solutions in the embodiments or in the background more clearly, the following briefly describes the accompanying drawings required for describing the embodiments or the background.

DETAILED DESCRIPTION OF EMBODIMENTS

The following describes embodiments with reference to the accompanying drawings in the embodiments.

An Ethernet transfer rate has developed from 10M, 100M, 1 G, and 10 G to 40 G and 100 G as technologies develop, and the current 40 G Ethernet and 100 G Ethernet have been widely applied. However, with rapid emergence of emerging services such as 2K/4K videos and cloud computing, there is an urgent requirement for high bandwidth. This drives Ethernet to evolve towards a higher rate. Currently, the IEEE further defines 400 G Ethernet, and the Optical Internetworking Forum OIF of the International Organization for Standardization extends application scenarios of conventional Ethernet, to support functions such as subrates, channelization, and inverse multiplexing for Ethernet services, and names such an Ethernet technology as flexible Ethernet (FlexE).

As an interface technology, the FlexE technology can support point-to-point application, and has attracted industry attention as a potential network transmission technology. To develop FlexE into a network transmission technology, a multi-service processing problem further needs to be resolved. For example, in a metropolitan range, support for low-rate services is required in enterprise private line and wireless backhaul scenarios. Therefore, how to carry a low-rate service on FlexE becomes a technical problem that needs to be resolved.

The embodiments provide a service processing method and apparatus and a related device, to carry a low-rate service and improve bandwidth utilization.

Figure 1:
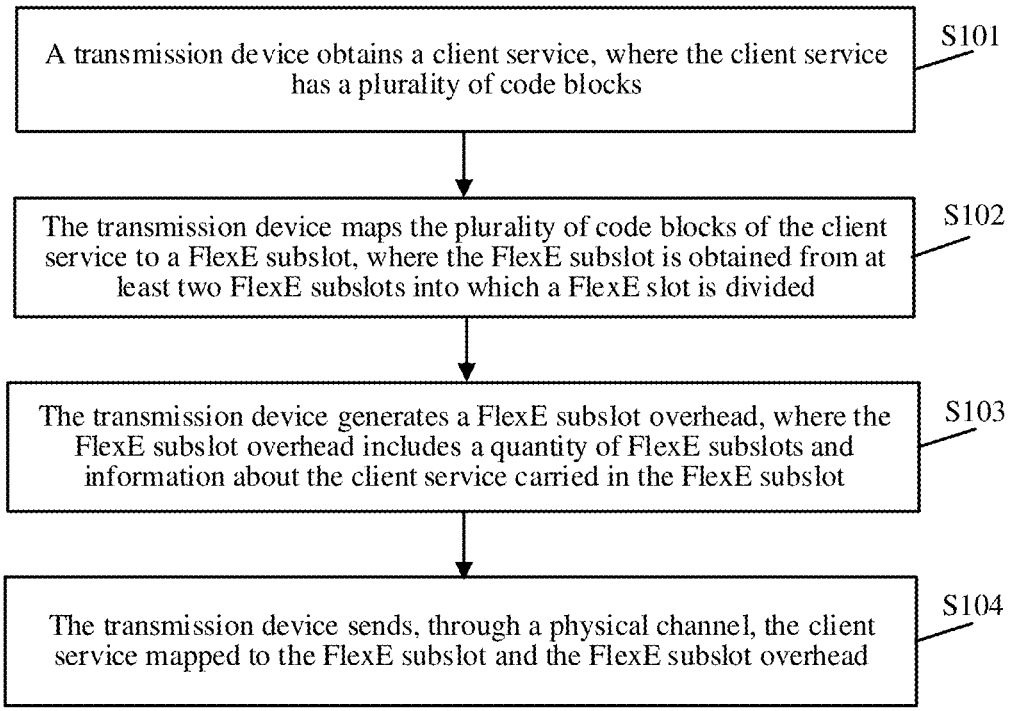
FIG. 1 is a schematic flowchart of a service processing method according to an embodiment.

FIG. 1 is a schematic flowchart of a service processing method according to an embodiment. As shown in FIG. 1, the service processing method may include the following steps.

In step S101: a transmission device obtains a client service, where the client service has a number of code blocks.

In step S102, the transmission device maps the number of code blocks of the client service to a FlexE subslot, where the FlexE subslot is obtained from at least two FlexE subslots into which a FlexE slot is divided.

In this embodiment, all slots described above are FlexE slots, and all subslots described above are FlexE subslots.

In this embodiment, a quantity of subslots obtained by dividing the FlexE slot is obtained based on a ratio of bandwidth of the FlexE slot to bandwidth of the FlexE subslot. In an optional implementation, bandwidth of a subslot may be predetermined, and then a quantity of subslots is determined. For example, a quantity of subslots that need to be obtained through division is determined according to a bandwidth requirement of the client service. Assuming that the bandwidth requirement of the client service is 2.5 G and bandwidth of each FlexE slot is 5 G, the FlexE slot may be divided into two subslots. In another optional implementation, the quantity of subslots may be predetermined, and then the bandwidth of the subslot is determined. For example, a FlexE slot needs to be divided into two subslots, and bandwidth of each subslot is a half of bandwidth of the FlexE slot.

When one FlexE slot is divided into two subslots, and bandwidth of the FlexE slot cannot be evenly divided, a remaining location of the FlexE slot that cannot be evenly divided may not participate in slot division.

In this embodiment, when the FlexE slot is divided into two subslots, the FlexE slot includes N code blocks, the N code blocks include a first code block and a second code block, the two FlexE subslots include a first subslot and a second subslot, the first code block is allocated to the first subslot, and the second code block is allocated to the second subslot. The first code block and the second code block are code blocks of different client services, and the first subslot and the second subslot are two types of subslots obtained by dividing one FlexE slot.

In step S103, the transmission device generates a FlexE subslot overhead, where the FlexE subslot overhead includes a quantity of FlexE subslots and information about the client service carried in the FlexE subslot.

The FlexE subslot overhead is indicated by using a slot overhead field. The information about the client service includes a service type and/or a service identifier of the client service. The service identifier is used to identify a service to which the subslot belongs, and as shown in Table 1 below, the service type and the service identifier of the client service are determined based on a value of the slot overhead field.

TABLE 1

| Service type | Value | Service identifier | Value |
| --- | --- | --- | --- |
| Ethernet | 000000000 | Unused | 0000 |
| ODUk | 000000001 | Client1 | 0001 |
| . . . | . . . | . . . | . . . |
| CPRI optionX | 000000100 | Client4 | 0100 |
| Reserved | 111111101 | unavailable | 1111 |

S104, the transmission device sends, through at least one physical channel, the client service mapped to the FlexE subslot and the FlexE subslot overhead.

It can be understood that according to the service processing method shown in FIG. 1, the number of code blocks of the client service may be mapped to the FlexE subslot, and the FlexE subslot overhead is generated, so that the client service mapped to the FlexE subslot and the FlexE subslot overhead are sent through the physical channel, and a low-rate service is carried. Compared with carrying a low-rate service by directly using an entire FlexE slot, carrying the client service by dividing the FlexE slot into a number of subslots can improve bandwidth utilization.

Figure 2:
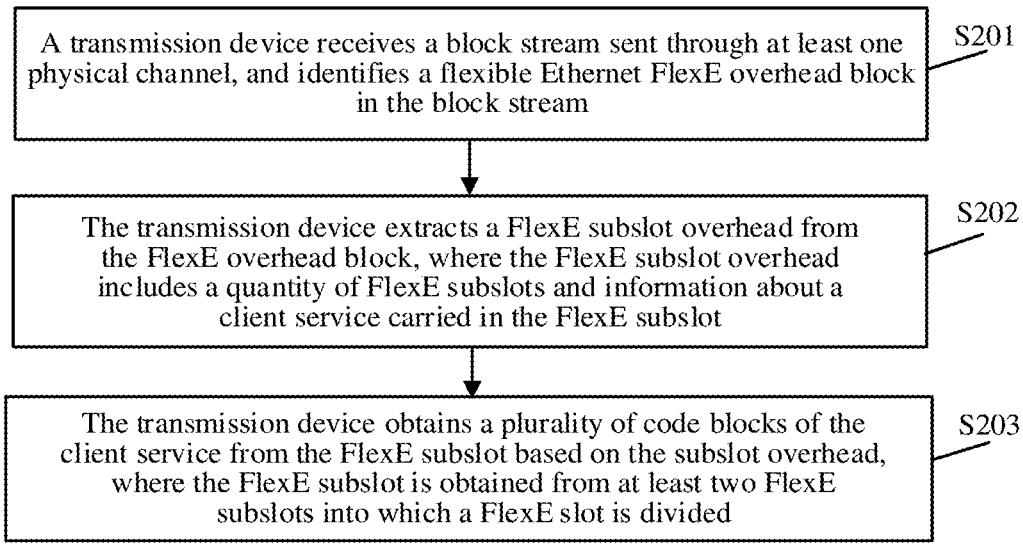
FIG. 2 is a schematic flowchart of another service processing method according to an embodiment.

FIG. 2 is a schematic flowchart of another service processing method according to an embodiment. The service processing method shown in FIG. 2 is described from the perspective of a receive end, and as shown in FIG. 2, the service processing method may include the following steps.

In step S201, a transmission device receives a block stream sent through at least one physical channel, and identifies a flexible Ethernet FlexE overhead block in the block stream.

For example, before the transmission device identifies the flexible Ethernet FlexE overhead block in the block stream, the method further includes: after receiving the block stream from the at least one physical channel, delimiting, aligning, and re-arranging, by the transmission device, 66B blocks in the block stream to restore a correct 66B block stream; and aligning channels of data by identifying the determined FlexE overhead block.

In step S202, the transmission device extracts a FlexE subslot overhead from the FlexE overhead block, where the FlexE subslot overhead includes a quantity of FlexE subslots and information about a client service carried in the FlexE subslot.

The FlexE subslot overhead is indicated by using a slot overhead field. The information about the client service includes a service type and/or a service identifier of the client service.

In step S203, the transmission device obtains a number of code blocks of the client service from the FlexE subslot based on the subslot overhead, where the FlexE subslot is obtained from at least two FlexE subslots into which a FlexE slot is divided.

The number of code blocks include a first code block and a second code block, the at least two FlexE subslot includes a first subslot and a second subslot, the first subslot carries the first code block, and the second subslot carries the second code block. The first code block is a code block of the client service carried in the first subslot, and the second code block is a code block of the client service carried in the second subslot.

For example, the quantity of FlexE subslots is obtained based on a ratio of the bandwidth of the FlexE slot to bandwidth of the FlexE subslot, as described in the two implementations in the embodiments described above, and details are not described herein again.

It can be understood that according to the service processing method shown in FIG. 2, low-rate service data can be parsed out from the subslot based on the subslot overhead in the slot overhead field.

Figure 3:
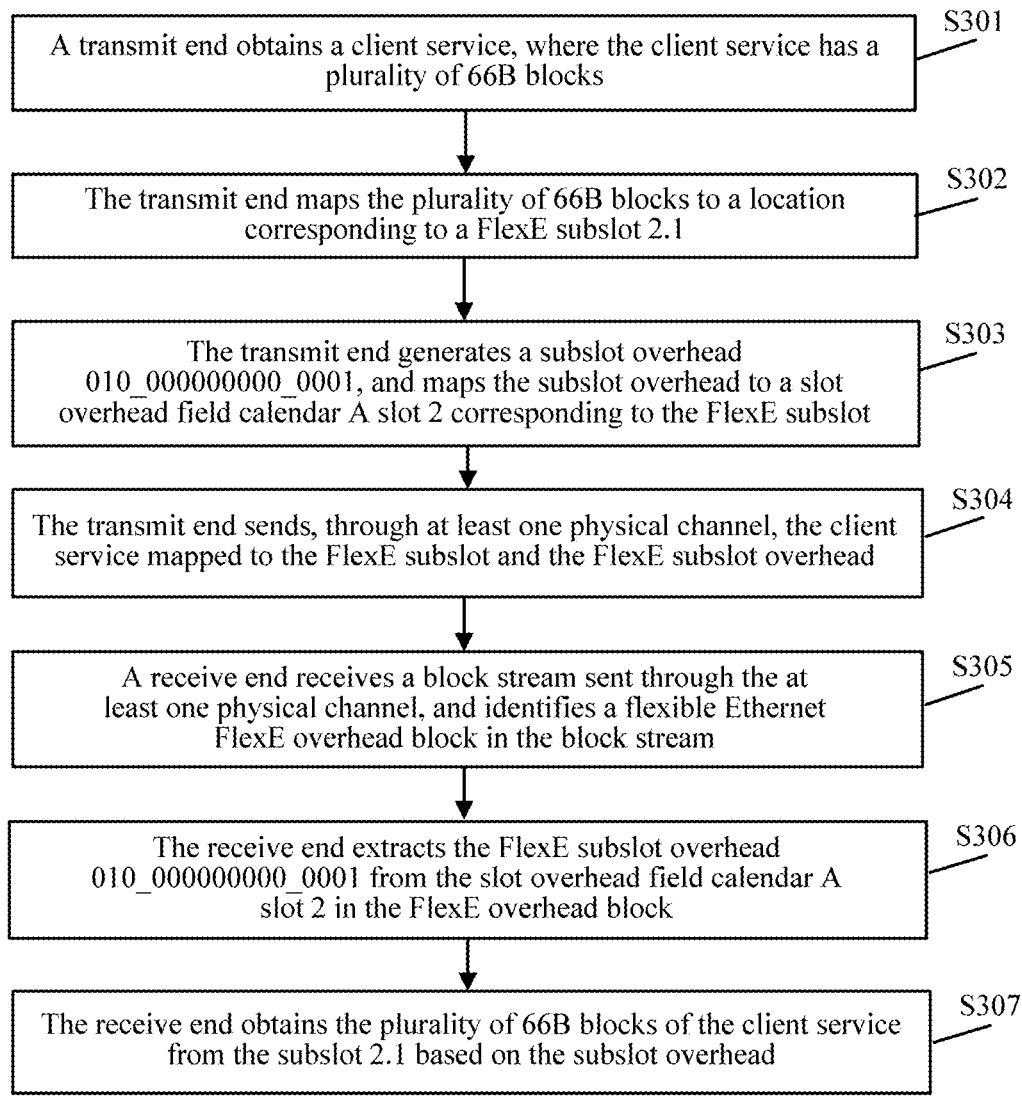
FIG. 3 is a schematic flowchart of still another service processing method according to an embodiment.

FIG. 3 is a schematic flowchart of another service processing method according to an embodiment. The service processing method shown in FIG. 3 is described from the perspective of a transmit end and a receive end. For example, in the service processing method shown in FIG. 3, bandwidth of a physical channel is 100 GE, that is, flexible Ethernet may be bound to M 100 GE physical channels (M is an integer greater than or equal to 1). Each physical channel has a rate of 100 Gbps, 66B blocks may be transmitted on the physical channel, and eight consecutive (1023*20+1) 66B blocks form one frame (where 1 indicates that one overhead block is inserted every 1023*20 consecutive 66B blocks). Such a frame is divided into 20 slots, and each slot has 1023 locations that can be used to store data. For example, this embodiment is described from the perspective of a master calendar and sub-calendars of FlexE Shim, and each physical channel may correspond to each sub-calendar.

Figure 4:
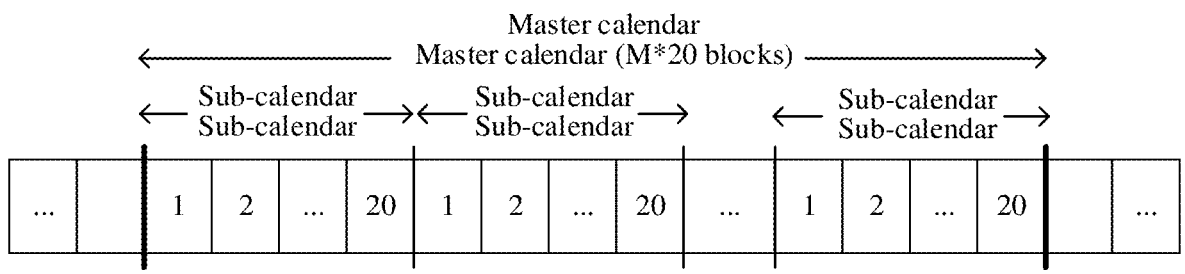
FIG. 4 is a schematic structural diagram of a 100GE master calendar and 100GE sub-calendars according to an embodiment.

The master calendar has 20*M slots in a unit of a 66B block, where M represents a quantity of sub-calendars, and the master calendar may distribute 20*M slots that carry 66B blocks, to M sub-calendars through polling. Each sub-calendar has 20 consecutive slots that can carry 66B blocks, and the 20 consecutive slots that can carry 66B blocks are briefly referred to as 20 consecutive blocks. FIG. 4 is a schematic structural diagram of a 100 GE master calendar and 100 GE sub-calendars according to an embodiment. M sub-calendars correspond to M physical channels.

Figure 5:
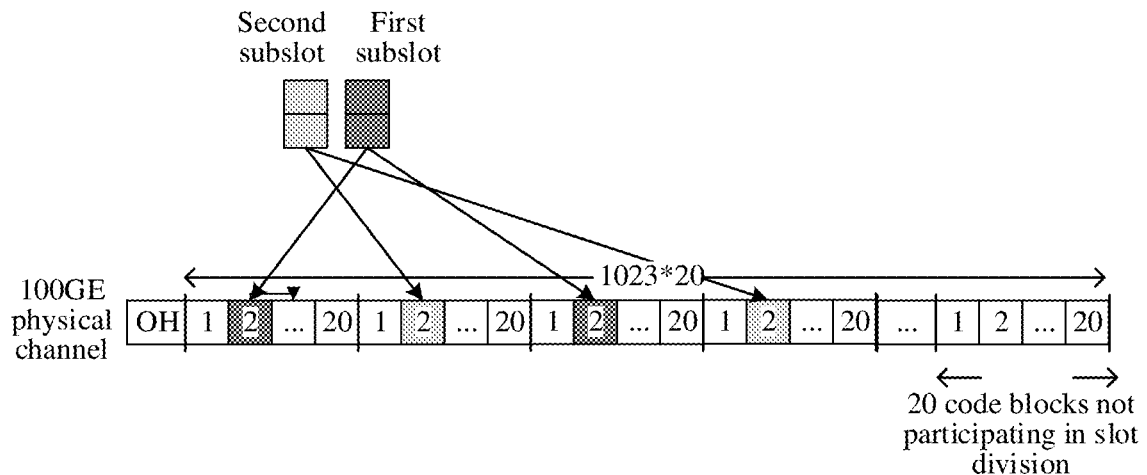
FIG. 5 is a schematic diagram of a subslot division manner according to an embodiment.

A method for subslot division is: for a slot i ($1 \leq i \leq 20$) on a sub-calendar, a subslot i.n is defined by using, as a period, bandwidth required by a client service or a quantity n of subslots that need to be obtained through division. For example, bandwidth required by the client service is 2.5 G, and then a corresponding quantity of subslots is 2. For the slot i ($1 \leq i \leq 20$) on the sub-calendar, 1023 locations of the slot i are divided by using, as a period, the quantity 2 of subslots that need to be obtained through division. FIG. 5 is a schematic diagram of a subslot division manner according to an embodiment. As shown in FIG. 5, a slot 2 on one physical channel is divided into two subslots, and each slot has bandwidth of 2.5 G. Then, a slot 2 in first 20 consecutive 66B blocks is a subslot 2.1, a slot 2 in next 20 consecutive 66B blocks is a subslot 2.2, a slot 2 in next 20 consecutive 66B blocks is a subslot 2.1, a slot 2 in next 20 consecutive 66B blocks is a subslot 2.2, and the rest can be deduced by analogy. Each slot corresponds to 1023 locations, and therefore, the locations cannot be evenly distributed to the subslots 2.1 and the subslots 2.2. In some embodiments, to ensure fixed locations of the subslots, the last 20 consecutive blocks may not participate in division into subslots.

Figure 9:
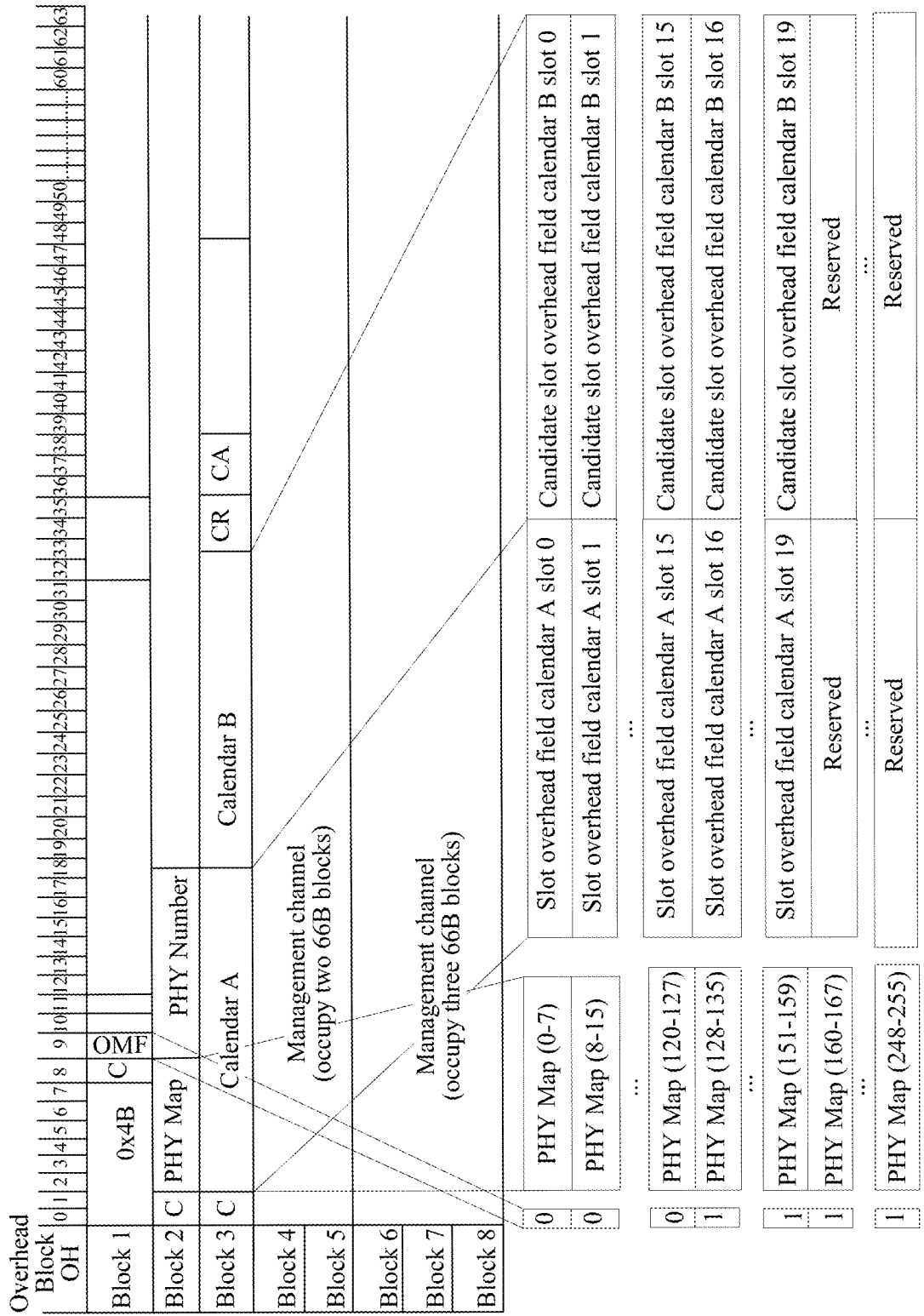
FIG. 9 is a schematic structural diagram of an overhead frame according to an embodiment.

On each physical channel, one 66B overhead block is inserted every 1023*20 slots, and eight consecutive inserted overhead blocks form one overhead frame. As shown in FIG. 9, the overhead frame may include a subslot overhead, for example, a quantity 2 of FlexE subslots and the information about the client service carried in the FlexE subslot. As shown in Table 1, the information about the client service may include a service type and/or a service identifier.

Figure 6:
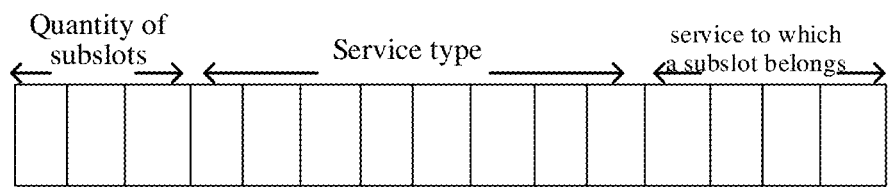
FIG. 6 is a schematic diagram of extension of a subslot overhead according to an embodiment.

For example, subslot overheads may be indicated by using slot overhead fields (calendar A slots 0 to 20) or candidate slot overhead fields (calendar B slots 0 to 20) in the overhead block. For example, FIG. 6 is a schematic diagram of extension of a subslot overhead according to an embodiment. The slot overhead field is divided into three parts: a first part of 3 bits, used to indicate a quantity of subslots; a second part of 9 bits, used to indicate a service type of a current subslot; and a third part of 4 bits, used to indicate a service to which the current subslot belongs. A current slot is divided into two subslots, and then an indication value of the quantity of subslots indicated by using the 3 bits is 010. The service type is Ethernet, and then an indication value of the service type of the subslot indicated by using the 9 bits is 000000000. An indication value of the service, Client1, to which the current subslot belongs and that is indicated by using the 4 bits is 0001, and an indication value of a subslot overhead of a first subslot may be 010_000000000_0001. A receive end may parse out, by parsing the subslot overhead, a corresponding client service in the first subslot corresponding to a sub-calendar.

FIG. 9 is a schematic structural diagram of an overhead frame according to an embodiment. As shown in FIG. 9, eight consecutive inserted overhead blocks form only one overhead frame, and in each overhead frame, only one slot overhead field calendar A slot or a candidate slot overhead field calendar B slot is used to indicate subslot overhead information carried in one of 20 consecutive slots. Therefore, as shown in FIG. 9, 32 overhead frames are required for indicating only one piece of subslot overhead information, and if two pieces of subslot overhead information carried in a slot need to be indicated, the two pieces of subslot overhead information need to be indicated in a next multiframe period. As shown in FIG. 9, one multiframe period includes 32 overhead frames (as shown in FIG. 9, a multiframe period indication OMF is used to indicate one multiframe period, that is, in the multiframe period, the first 16 overhead frames have a value of 0, and the last 16 overhead frames have a value of 1; and this is the same case in a next multiframe period). In the multiframe period, the first 20 overhead frames sequentially indicate a subslot overhead carried in each of corresponding 20 slots. Therefore, when a slot is divided into two subslots, two multiframe periods are required for completely indicating two subslot overheads. Correspondingly, when a slot is divided into T subslots, T multiframe periods are required for completely indicating T subslot overheads.

Correspondingly, locations of a slot that cannot be evenly divided do not participate in service processing. A subslot overhead may be further extended, to indicate a quantity of code blocks that do not participate in slot division. As shown in Table 1, in the service type part, 3 bits may be obtained through division, to indicate code blocks not participating in slot division, and it is agreed that the code blocks not participating in the slot division are redundant and placed at the tail of the 1023 locations.

Figure 10:
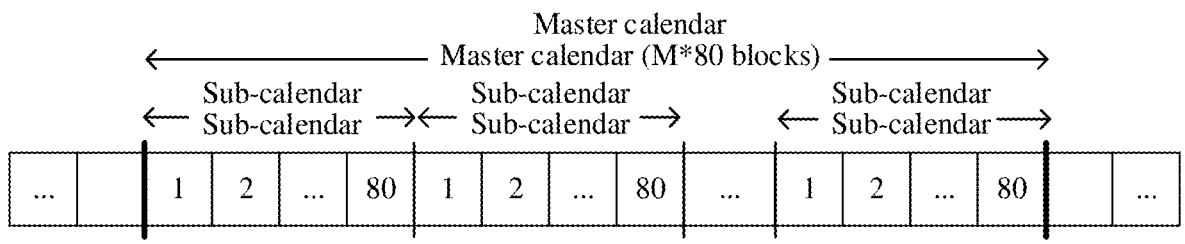
FIG. 10 is a schematic structural diagram of a 400 GE master calendar and 400 GE sub-calendars according to an embodiment.
Figure 11:
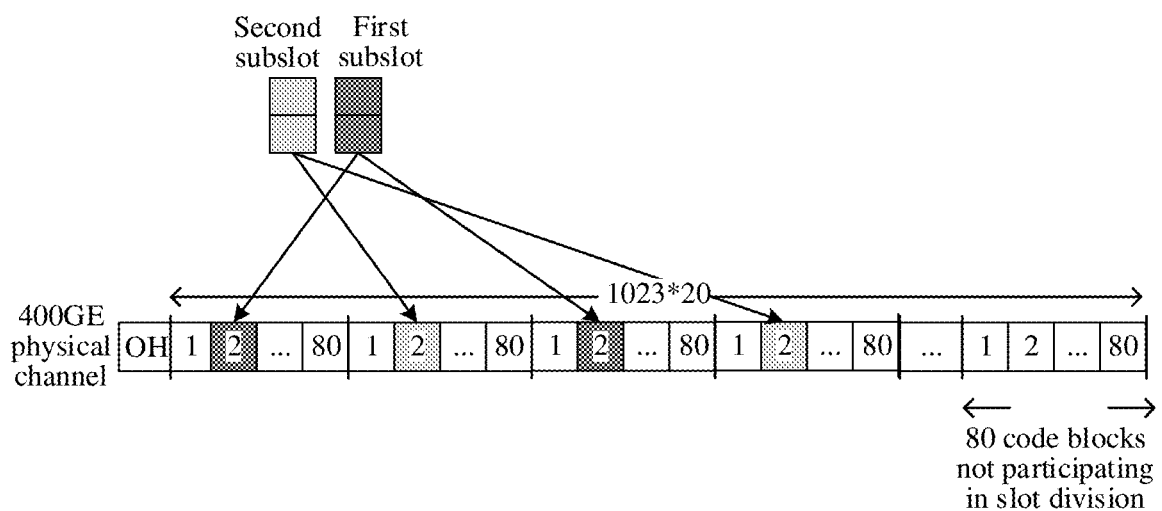
FIG. 11 is a schematic diagram of another subslot division manner according to an embodiment.

Optionally, for example, a physical channel has bandwidth of 400 GE. As shown in FIG. 10, a master calendar has 80*M slots that may carry 66B blocks, where M is a quantity of sub-calendars, and the 80*M slots that may carry 66B blocks may be distributed to M sub-calendars through polling. Each sub-calendar has 80 consecutive slots that can carry 66B blocks. A slot division rule on the 400 GE physical channel is the same as a slot division rule on a 100 GE physical channel. As shown in FIG. 11, a slot 2 is divided into two subslots, and each slot has bandwidth of 2.5 G. Then, the second slot of first 20 consecutive slots is a subslot 2.1, the second slot of next 20 consecutive slots is a subslot 2.2, the second slot of next 20 consecutive slots is a subslot 2.1, the second slot of next 20 consecutive slots is a subslot 2.2, and the rest can be deduced by analogy. Each slot corresponds to 1023 locations, and therefore, the locations cannot be evenly distributed to the subslots 2.1 and the subslots 2.2. To ensure fixed locations of the subslots, the last 20 consecutive blocks may not participate in division into subslots. It should be noted that, each sub-calendar has 80 consecutive slots that can carry 66B blocks, and therefore, for each sub-calendar, four overhead blocks need to be inserted every 1023*80 consecutive blocks.

For example, the service processing method shown in FIG. 3 may include the following steps.

In step S301, a transmit end obtains a client service, where the client service has a number of 66B blocks.

In step s302, the transmit end maps the number of 66B blocks to a location corresponding to a FlexE subslot 2.1.

In step S303, the transmit end generates a subslot overhead 010_000000000_0001, and maps the subslot overhead to a slot overhead field calendar A slot 2 corresponding to the FlexE subslot.

The slot overhead field calendar A slot 2 may be used to place a subslot overhead of a first subslot in a first multiframe period, and the slot overhead field calendar A slot 2 may be used to place a subslot overhead of a second subslot in a second multiframe period.

In step S304, the transmit end sends, through at least one physical channel, the client service mapped to the FlexE subslot and the FlexE subslot overhead.

In step S305, a receive end receives a block stream sent through the at least one physical channel, and identifies a flexible Ethernet FlexE overhead block in the block stream.

Figure 7:
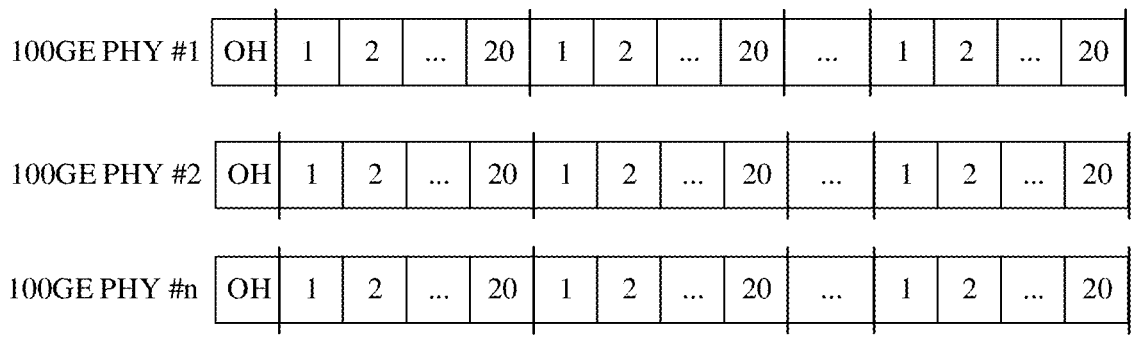
FIG. 7 is a schematic diagram of aligning code blocks received on physical channels according to an embodiment.

After receiving the block stream from the at least one physical channel, the receive end first delimits, aligns, and re-arranges 66B blocks in the block stream, to restore a correct stream of 66B blocks; and aligns channels of data by identifying the determined FlexE overhead block. FIG. 7 is a schematic diagram of aligning code blocks received on physical channels according to an embodiment. A number of physical channels PHY, for example, 100 GE PHY #1, 100 GE PHY #2, and 100 GE PHY #n are aligned by using an overhead block OH.

In step S306, the receive end extracts the FlexE subslot overhead 010_000000000_0001 from the slot overhead field Calendar A Slot 2 in the FlexE overhead block.

In step S307, the receive end obtains the number of 66B blocks of the client service from the subslot 2.1 based on the subslot overhead.

In conclusion, through implementation of this embodiment, the transmit end may map the number of code blocks of the client service to the subslot and generate the subslot overhead, and the subslot overhead is indicated in the slot overhead field, so that the receive end can parse out the code blocks of the client service from the subslot based on the subslot overhead. It can be understood that, according to this embodiment, a low-rate service can be mapped to a subslot for sending, and compared with mapping the low-rate service to a slot for sending, bandwidth utilization can be improved.

Figure 8:
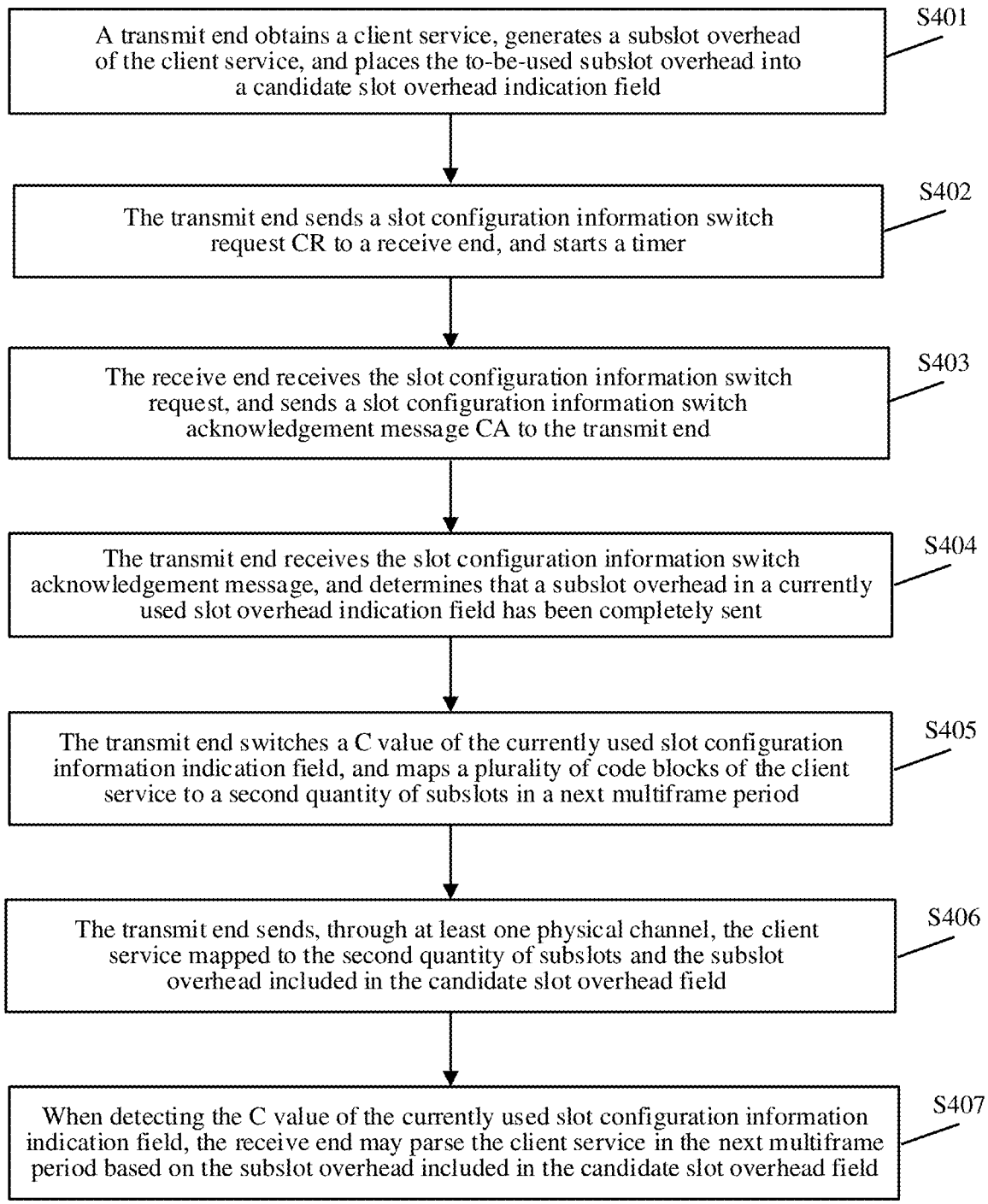
FIG. 8 is a schematic flowchart of still another service processing method according to an embodiment.

FIG. 8 is a schematic flowchart of still another service processing method according to an embodiment. According to the service processing method shown in FIG. 8, a quantity of subslots obtained through division can be flexibly switched. For example, as shown in FIG. 8, the service processing method may include the following steps.

In step S401, a transmit end obtains a client service, generates a subslot overhead of the client service, and places the to-be-used subslot overhead into a candidate slot overhead field.

For example, if a currently used slot overhead field is a calendar A slot, and a slot divided into two subslots is a slot 2, a calendar A slot 2 may indicate a subslot overhead in different multiframe periods. The candidate slot overhead field is a calendar B slot, and the to-be-used subslot overhead may be set in a slot 2, for example, a calendar B slot 2, that is in the calendar B slot and that is divided into subslots. For example, if the to-be-used subslot overhead indicates that a quantity of subslots is 4, four multiframe periods are required to completely send subslot overheads of the four subslots. When the candidate slot overhead field is used, the current slot 2 switches from supporting two subslots to supporting four subslots.

In step S402, the transmit end sends a slot configuration information switch request (CR) to a receive end, and starts a timer.

The CR is used to indicate that the FlexE slot switches from a first quantity of FlexE subslots to a second quantity of FlexE subslots.

In step S403, the receive end receives the slot configuration information switch request, and sends a slot configuration information switch acknowledgement message (CA) to the transmit end.

The CA is used to indicate that the FlexE slot can switch from the first quantity of FlexE subslots to the second quantity of FlexE subslots.

In step S404, the transmit end receives the slot configuration information switch acknowledgement message, and determines whether a subslot overhead in a currently used slot overhead field has been completely sent; and when the subslot overhead in the currently used slot overhead field has been completely sent, performs step S405; otherwise, the transmit end needs to wait until determining that the subslot overhead has been completely sent, and then performs step S405.

For example, the currently used slot overhead field needs to indicate two subslot overheads, and as described above, two multiframe periods are required to completely send the subslot overheads.

In step S405, the transmit end switches a C value of the currently used slot configuration information indication field, and maps a number of code blocks of the client service to a second quantity of subslots in a next multiframe period.

In step S406, the transmit end sends, through at least one physical channel, the client service mapped to the second quantity of subslots and the subslot overhead included in the candidate slot overhead field.

In step S407, when detecting the C value of the currently used slot configuration information indication field, the receive end may parse the client service in the next multiframe period based on the subslot overhead included in the candidate slot overhead field.

According to this embodiment, the C value of the currently used slot configuration information indication field may be switched, so that the FlexE slot switches from supporting two subslots to supporting four subslots, and a flexible change in subslot division or hybrid transmission is implemented, thereby changing service bandwidth.

The foregoing describes the methods in the embodiments in detail, and the following provides apparatuses according to the embodiments. It should be understood that, the apparatuses or devices described in the embodiments may implement a related procedure or implementation of the service processing method in any one of FIG. 1 to FIG. 11. For brevity, details are not described herein again.

Figure 12:
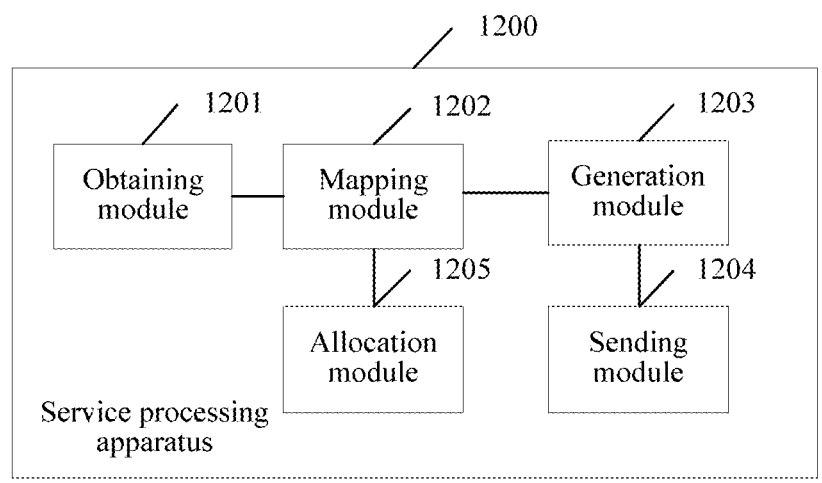
FIG. 12 is a schematic structural diagram of a service processing apparatus according to an embodiment.

FIG. 12 is a schematic structural diagram of a service processing apparatus according to an embodiment. The service processing apparatus 1200 may include an obtaining module 1201, a mapping module 1202, a generation module 1203, and a sending module 1204, and may further include an allocation module 1205 and a receiving module 1206.

The obtaining module 1201 is configured to obtain a client service, where the client service has a number of code blocks.

The mapping module 1202 is configured to map the number of code blocks of the client service to a flexible Ethernet FlexE subslot, where the FlexE subslot is obtained from at least two FlexE subslots into which a FlexE slot is divided.

The generation module 1203 is configured to generate a FlexE subslot overhead, where the FlexE subslot overhead includes a quantity of FlexE subslots and information about the client service carried in the FlexE subslot. In this embodiment, the information about the client service includes a service type and/or a service identifier of the client service.

The sending module 1204 is configured to send, through at least one physical channel, the client service mapped to the FlexE subslot and the FlexE subslot overhead.

In this embodiment, the FlexE slot includes N code blocks, the N code blocks include a first code block and a second code block, the at least two FlexE subslots include a first subslot and a second subslot, the first code block is allocated to the first subslot, and the second code block is allocated to the second subslot.

In this embodiment, the quantity of FlexE subslots is obtained based on a ratio of the bandwidth of the FlexE slot to bandwidth of the FlexE subslot.

The allocation module 1205 is configured to allocate the bandwidth of the FlexE slot to the at least two FlexE subslots.

For example, bandwidth of a physical channel is 100 GE, that is, flexible Ethernet may be bound to M 100 GE physical channels (M is an integer greater than or equal to 1). Each physical channel has a rate of 100 Gbps, 66B blocks may be transmitted on the physical channel, and eight consecutive (1023*20+1) 66B blocks form one frame (where 1 indicates that one overhead block is inserted every 1023*20 consecutive 66B blocks). Such a frame is divided into 20 slots, and each slot has 1023 locations that can be used to store data.

A process in which the allocation module 1205 performs slot division or allocation may include: For a slot i (1≤i≤20) on a sub-calendar, a subslot i.n is defined by using, as a period, bandwidth required by the client service or a quantity n of subslots that need to be obtained through division. For example, bandwidth required by the client service is 2.5 G, and then a corresponding quantity of subslots is 2. For the slot i (1≤i≤20) on the sub-calendar, 1023 locations of the slot i are divided by using the quantity of subslots that need to be obtained through division, that is, 2, as a period. FIG. 5 is a schematic diagram of a subslot division manner according to an embodiment. As shown in FIG. 5, a slot 2 on one physical channel is divided into two subslots, and each slot has bandwidth of 2.5 G. Then, a slot 2 in first 20 consecutive 66B blocks is a subslot 2.1, a slot 2 in next 20 consecutive 66B blocks is a subslot 2.2, a slot 2 in next 20 consecutive 66B blocks is a subslot 2.1, a slot 2 in next 20 consecutive 66B blocks is a subslot 2.2, and the rest can be deduced by analogy. Each slot corresponds to 1023 locations, and, therefore, the locations cannot be evenly distributed to the subslots 2.1 and the subslots 2.2. To ensure fixed locations of the subslots, the allocation module 1205 may disable the last 20 consecutive blocks from participating in slot division.

On each physical channel, one 66B overhead block is inserted every 1023*20 slots, and eight consecutive inserted overhead blocks form one overhead frame. As shown in FIG. 9, the overhead frame may include a subslot overhead, for example, a quantity 2 of FlexE subslots and the information about the client service carried in the FlexE subslot. As shown in Table 1, the information about the client service may include a service type and/or a service identifier. Further, in the service type included in the information about the client service, three bits may be obtained through division to indicate blocks that do not participate in slot division.

Optionally, the sending module 1204 is further configured to send a slot information switch request CR to a receive end, where the CR is used to indicate that the FlexE slot switches from a first quantity of FlexE subslots to a second quantity of FlexE subslots; and the receiving module 1206 is configured to receive a slot information switch acknowledgment message CA returned by the receive end, where the CA is used to indicate that the FlexE slot can switch from the first quantity of FlexE subslots to the second quantity of FlexE subslots.

For example, if a currently used slot overhead field is a calendar A slot, and a slot divided into two subslots is a slot 2, a calendar A slot 2 may indicate a subslot overhead in different multiframe periods. The candidate slot overhead field is a calendar B slot, and the to-be-used subslot overhead may be set in a slot 2, for example, a calendar B slot 2, that is in the calendar B slot and that is divided into subslots. For example, if the to-be-used subslot overhead indicates that a quantity of subslots is 4, four multiframe periods are utilized to completely send subslot overheads of the four subslots. When the candidate slot overhead field is used, the current slot 2 switches from supporting two subslots to supporting four subslots.

It can be understood that the sending module and the receiving module can implement a handshake between the transmit end and the receive end by using overheads of the CR and the CA, and indicate, by switching a slot configuration information indication field C, that the currently used slot overhead field is switched in a next multiframe period, so that the FlexE slot switches from supporting two subslots to supporting four subslots, and a flexible change in subslot division or hybrid transmission is implemented, thereby changing service bandwidth.

Therefore, the service processing apparatus shown in FIG. 12 can map the number of code blocks of the client service to the FlexE subslot and generate the FlexE subslot overhead, so as to send the client service mapped to the FlexE subslot and the FlexE subslot overhead through the physical channel, thereby carrying a low-rate service. Compared with carrying a low-rate service by directly using an entire FlexE slot, carrying the client service by dividing the FlexE slot into a number of subslots can improve bandwidth utilization.

Figure 13:
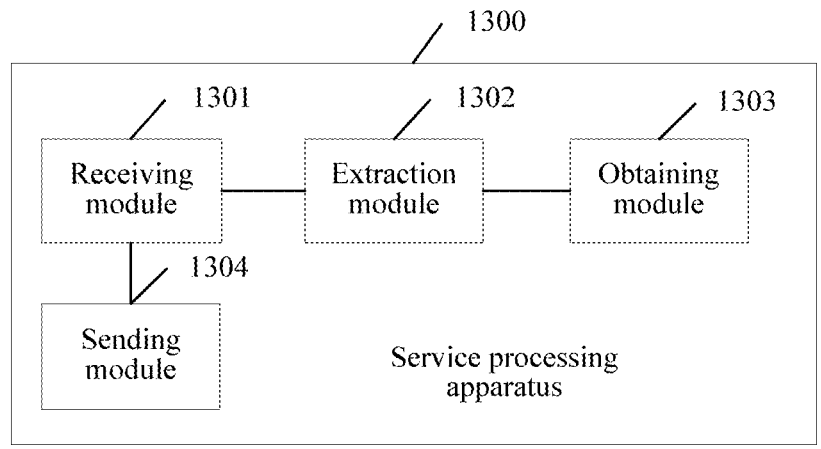
FIG. 13 is a schematic structural diagram of another service processing apparatus according to an embodiment.

FIG. 13 is a schematic structural diagram of another service processing apparatus according to an embodiment. The service processing apparatus 1300 may include a receiving module 1301, an extraction module 1302, and an obtaining module 1303, and may further include a sending module 1304.

The receiving module 1301 is configured to: receive a block stream sent through at least one physical channel, and identify a flexible Ethernet FlexE overhead block in the block stream.

For example, before identifying the flexible Ethernet FlexE overhead block in the block stream, and after receiving the block stream from the at least one physical channel, the receiving module 1301 first delimits, aligns, and re-arranges 66B blocks in the block stream to restore a correct stream of 66B blocks; and aligns channels of data by identifying the determined FlexE overhead block.

The extraction module 1302 is configured to extract a FlexE subslot overhead from the FlexE overhead block, where the FlexE subslot overhead includes a quantity of FlexE subslots and information about a client service carried in the FlexE subslot.

In this embodiment, the information about the client service includes a service type and/or a service identifier of the client service.

The obtaining module 1303 is configured to obtain a number of code blocks of the client service from the FlexE subslot based on the subslot overhead, where the FlexE subslot is obtained from at least two FlexE subslots into which a FlexE slot is divided.

In this embodiment, the number of code blocks include a first code block and a second code block, the at least two FlexE subslot includes a first subslot and a second subslot, the first subslot carries the first code block, and the second subslot carries the second code block. The first code block is a code block of the client service carried in the first subslot, and the second code block is a code block of the client service carried in the second subslot.

In this embodiment, the quantity of FlexE subslots is obtained based on a ratio of bandwidth of the FlexE slot to bandwidth of the FlexE subslot.

Optionally, the receiving module 1301 is further configured to receive a slot information switch request CR sent by a transmit end, where the CR is used to indicate that the FlexE slot switches from a first quantity of FlexE subslots to a second quantity of FlexE subslots.

The sending module 1304 is configured to send a slot information switch acknowledgment message CA to the transmit end, where the CA is used to indicate that the FlexE slot can switch from the first quantity of FlexE subslots to the second quantity of FlexE subslots.

It can be understood that in the service processing apparatus, the receiving module 1301 and the sending module 1304 can implement a handshake between the transmit end and the receive end by using overheads of the CR and the CA, and indicate, by switching a slot configuration information indication field C, that the currently used slot overhead field is switched in a next multiframe period, so that the FlexE slot switches from supporting two subslots to supporting four subslots, and a flexible change in subslot division or hybrid transmission is implemented, thereby changing service bandwidth.

In conclusion, the service processing apparatus shown in FIG. 13 can parse out low-rate service data from the subslot based on the subslot overhead.

Figure 14:
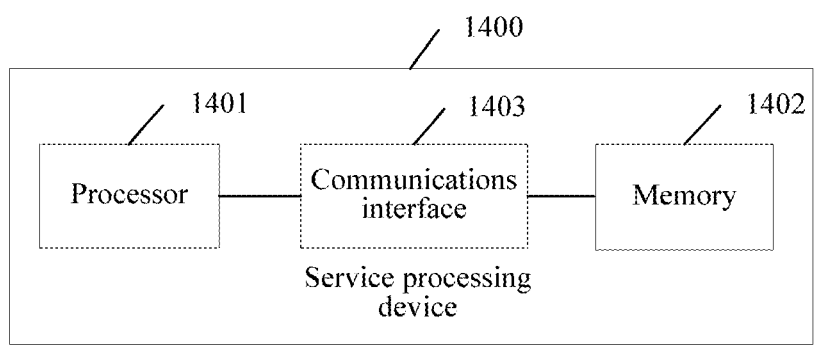
FIG. 14 is a schematic structural diagram of a service processing device according to an embodiment.

FIG. 14 shows a service processing device 1400 according to an embodiment. The service processing device 1400 includes a processor 1401, a memory 1402, and a communications interface 1403. The processor 1401, the memory 1402, and the communications interface 1403 are connected to each other by using a bus.

The memory 1402 includes but is not limited to a random access memory (RAM), a read-only memory (ROM), an erasable programmable read only memory (EPROM), or a compact disc read-only memory (CD-ROM), and the memory 1402 is configured to store related program code and data. The communications interface 1403 is configured to receive and send data.

The processor 1401 may be one or more central processing units (CPU). When the processor 1401 is one CPU, the CPU may be a single-core CPU or a multi-core CPU.

In this embodiment, the processor 1401 is configured to read the program code stored in the memory 1402, and may perform the following operations:

obtaining a client service, where the client service has a number of code blocks;

mapping the number of code blocks of the client service to a flexible Ethernet FlexE subslot, where the FlexE subslot is obtained from at least two FlexE subslots into which a FlexE slot is divided;

generating a FlexE subslot overhead, where the FlexE subslot overhead includes a quantity of FlexE subslots and information about the client service carried in the FlexE subslot; and sending, through at least one physical channel, the client service mapped to the FlexE subslot and the FlexE subslot overhead.

In this embodiment, the processor 1401 is configured to read the program code stored in the memory 1402, and may perform the following operation:

allocating bandwidth of the FlexE slot to the at least two FlexE subslots.

The FlexE slot includes N code blocks, the N code blocks include a first code block and a second code block, the at least two FlexE subslots include a first subslot and a second subslot, the first code block is allocated to the first subslot, and the second code block is allocated to the second subslot.

The quantity of FlexE subslots is obtained based on a ratio of the bandwidth of the FlexE slot to bandwidth of the FlexE subslot.

The information about the client service includes a service type and/or a service identifier of the client service.

For example, bandwidth of a physical channel is 100 GE, that is, flexible Ethernet may be bound to M 100 GE physical channels (M is an integer greater than or equal to 1). Each physical channel has a rate of 100 Gbps, 66B blocks may be transmitted on the physical channel, and eight consecutive (1023*20+1) 66B blocks form one frame (where 1 indicates that one overhead block is inserted every 1023*20 consecutive 66B blocks). Such a frame is divided into 20 slots, and each slot has 1023 locations that can be used to store data.

A process in which the processor 1401 performs slot division or allocation may include: for a slot i ($1 \leq i \leq 20$) on a sub-calendar, a subslot i.n is defined by using, as a period, bandwidth required by the client service or a quantity n of subslots that need to be obtained through division. For example, bandwidth required by the client service is 2.5 G, and then a corresponding quantity of subslots is 2. For the slot i ($1 > i > 20$) on the sub-calendar, 1023 locations of the slot i are divided by using the quantity of subslots that need to be obtained through division, that is, 2, as a period. FIG. 5 is a schematic diagram of a subslot division manner according to an embodiment. As shown in FIG. 5, a slot 2 on one physical channel is divided into two subslots, and each slot has bandwidth of 2.5 G. Then, a slot 2 in first 20 consecutive 66B blocks is a subslot 2.1, a slot 2 in next 20 consecutive 66B blocks is a subslot 2.2, a slot 2 in next 20 consecutive 66B blocks is a subslot 2.1, and a slot 2 in next 20 consecutive 66B blocks is a subslot 2.2, and the rest can be deduced by analogy. Each slot corresponds to 1023 locations, and therefore, the locations cannot be evenly distributed to the subslots 2.1 and the subslots 2.2. To ensure fixed locations of the subslots, the processor 1401 may disable the last 20 consecutive blocks from participating in slot division.

On each physical channel, one 66B overhead block is inserted every 1023*20 slots, and eight consecutive inserted overhead blocks form one overhead frame. As shown in FIG. 9, the overhead frame may include a subslot overhead, for example, a quantity 2 of FlexE subslots and the information about the client service carried in the FlexE subslot. As shown in Table 1, the information about the client service may include a service type and/or a service identifier. Further, in the service type included in the information about the client service, three bits may be obtained through division to indicate blocks that do not participate in slot division.

In this embodiment, the processor 1401 is configured to read the program code stored in the memory 1402, and may perform the following operations:

sending a slot information switch request CR to a receive end, where the CR is used to indicate that the FlexE slot switches from a first quantity of FlexE subslots to a second quantity of FlexE subslots; and receiving a slot information switch acknowledgment message CA returned by the receive end, where the CA is used to indicate that the FlexE slot can switch from the first quantity of FlexE subslots to the second quantity of FlexE subslots.

In the service processing device, the processor 1401 implements a handshake between the transmit end and the receive end by using overheads of the CR and the CA, and can indicate, by switching a C value of a slot configuration information indication field, that the currently used slot overhead field is switched in a next multiframe period, so that the FlexE slot switches from supporting two subslots to supporting four subslots, and a flexible change in subslot division or hybrid transmission is implemented, thereby changing service bandwidth.

Figure 15:
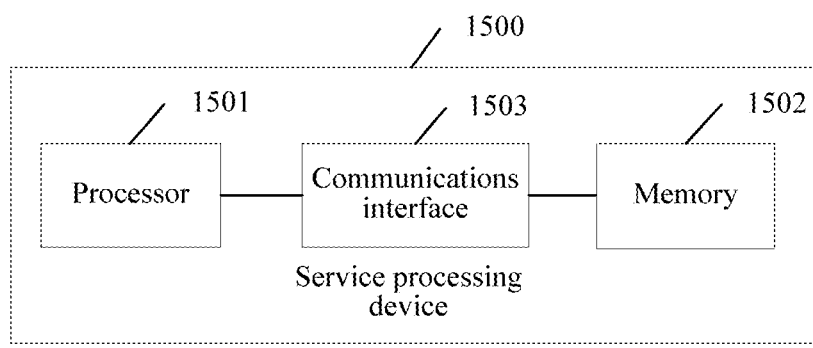
FIG. 15 is a schematic structural diagram of another service processing device according to an embodiment.

FIG. 15 shows a service processing device 1500 according to an embodiment. The service processing device 1500 includes a processor 1501, a memory 1502, and a communications interface 1503. The processor 1501, the memory 1502, and the communications interface 1503 are connected to each other by using a bus.

The memory 1502 includes but is not limited to a RAM, a ROM, an EPROM, or a CD-ROM, and the memory 1502 is configured to store related program code and data. The communications interface 1503 is configured to receive and send data.

The processor 1501 may be one or more central processing units (CPU). When the processor 1501 is one CPU, the CPU may be a single-core CPU, or a multi-core CPU.

The processor 1501 is configured to read the program code stored in the memory 1502, and may perform the following operations:

receiving a block stream sent through at least one physical channel, and identifying a flexible Ethernet FlexE overhead block in the block stream;

extracting a FlexE subslot overhead from the FlexE overhead block, where the FlexE subslot overhead includes a quantity of FlexE subslots and information about a client service carried in the FlexE subslot; and obtaining a number of code blocks of the client service from the FlexE subslot based on the subslot overhead, where the FlexE subslot is obtained from at least two FlexE subslots into which a FlexE slot is divided.

The number of code blocks include a first code block and a second code block, the at least two FlexE subslot includes a first subslot and a second subslot, the first subslot carries the first code block, and the second subslot carries the second code block.

The quantity of FlexE subslots is obtained based on a ratio of the bandwidth of the FlexE slot to bandwidth of the FlexE subslot.

The information about the client service includes a service type and/or a service identifier of the client service.

Therefore, the service processing device can parse out low-rate service data from the subslot based on the subslot overhead.

The processor 1501 is configured to read the program code stored in the memory 1502, and may further perform the following operations:

receiving a slot information switch request CR sent by a transmit end, where the CR is used to indicate that the FlexE slot switches from a first quantity of FlexE subslots to a second quantity of FlexE subslots; and sending a slot information switch acknowledgment message CA to the transmit end, where the CA is used to indicate that the FlexE slot can switch from the first quantity of FlexE subslots to the second quantity of FlexE subslots.

The service processing device can implement a handshake between the transmit end and the receive end by using overheads of the CR and the CA, and indicate, by switching a slot configuration information indication field C, that the currently used slot overhead field is switched in a next multiframe period, so that the FlexE slot switches from supporting two subslots to supporting four subslots, and a flexible change in subslot division or hybrid transmission is implemented, thereby changing service bandwidth.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium includes: any medium that can store program code, such as a ROM, a random access memory RAM, a magnetic disk, or an optical disc.

What is claimed is:

1. A service processing method, comprising:
obtaining a client service, wherein the client service has a plurality of code blocks;
mapping the plurality of code blocks of the client service to a flexible Ethernet (FlexE) subslot, wherein the FlexE subslot is obtained from at least two FlexE subslots into which a FlexE slot is divided;
generating a FlexE subslot overhead, wherein the FlexE subslot overhead comprises a quantity of FlexE subslots and information about the client service carried in the FlexE subslot; and
sending, through at least one physical channel, the client service mapped to the FlexE subslot and the FlexE subslot overhead.

2. The method according to claim 1, further comprising:
allocating bandwidth of the FlexE slot to the at least two FlexE subslots.

3. The method according to claim 2, wherein
the FlexE slot comprises N code blocks, the N code blocks comprise a first code block and a second code block, the at least two FlexE subslots comprise a first subslot and a second subslot, the first code block is allocated to the first subslot, and the second code block is allocated to the second subslot.

4. The method according to claim 3, wherein
the quantity of FlexE subslots is obtained based on a ratio of the bandwidth of the FlexE slot to bandwidth of the FlexE subslot.

5. The method according to claim 4, wherein
the information about the client service comprises at least one of a service type and a service identifier of the client service.

6. The method according to claim 5, further comprising:
sending a slot information switch request (CR) to a receive end, wherein the CR is used to indicate that the FlexE slot switches from a first quantity of FlexE subslots to a second quantity of FlexE subslots; and
receiving a slot information switch acknowledgment message (CA) returned by the receive end, wherein the CA is used to indicate that the FlexE slot is allowed to switch from the first quantity of FlexE subslots to the second quantity of FlexE subslots.

7. A service processing method, comprising:
receiving a block stream sent through at least one physical channel, and identifying a flexible Ethernet (FlexE) overhead block in the block stream;
extracting a FlexE subslot overhead from the FlexE overhead block, wherein the FlexE subslot overhead comprises a quantity of FlexE subslots and information about a client service carried in the FlexE subslot; and
obtaining a plurality of code blocks of the client service from the FlexE subslot based on the FlexE subslot overhead, wherein the FlexE subslot is obtained from at least two FlexE subslots into which a FlexE slot is divided.

8. The method according to claim 7, wherein
the plurality of code blocks comprise a first code block and a second code block, the at least two FlexE subslot comprises a first subslot and a second subslot, the first subslot carries the first code block, and the second subslot carries the second code block.

9. The method according to claim 8, wherein
the quantity of FlexE subslots is obtained based on a ratio of the bandwidth of the FlexE slot to bandwidth of the FlexE subslot.

10. The method according to claim 9, wherein
the information about the client service comprises at least one of a service type and a service identifier of the client service.

11. The method according to claim 10, wherein the method further comprises:
receiving a slot information switch request CR sent by a transmit end, wherein the CR is used to indicate that the FlexE slot switches from a first quantity of FlexE subslots to a second quantity of FlexE subslots; and
sending a slot information switch acknowledgment message (CA) to the transmit end, wherein the CA is used to indicate that the FlexE slot is allowed to switch from the first quantity of FlexE subslots to the second quantity of FlexE subslots.

12. A service processing apparatus, comprising a processor and a memory, wherein the memory is configured to store a program instruction, and the processor is configured to invoke the program instruction in the memory to:
obtain a client service, wherein the client service has a plurality of code blocks;
map the plurality of code blocks of the client service to a flexible Ethernet (FlexE) subslot, wherein the FlexE subslot is obtained from at least two FlexE subslots into which a FlexE slot is divided;
generate a FlexE subslot overhead, wherein the FlexE subslot overhead comprises a quantity of FlexE subslots and information about the client service carried in the FlexE subslot; and
send, through at least one physical channel, the client service mapped to the FlexE subslot and the FlexE subslot overhead.

13. The apparatus according to claim 12, the processor is further configured to comprising:
allocate bandwidth of the FlexE slot to the at least two FlexE subslots.

14. The apparatus according to claim 13, wherein the FlexE slot comprises N code blocks, the N code blocks comprise a first code block and a second code block, the at least two FlexE subslots comprise a first subslot and a second subslot, the first code block is allocated to the first subslot, and the second code block is allocated to the second subslot.

15. The apparatus according to claim 14, wherein
the quantity of FlexE subslots is obtained based on a ratio of the bandwidth of the FlexE slot to bandwidth of the FlexE subslot.

16. The apparatus according to claim 15, wherein
the information about the client service comprises at least one of service type and a service identifier of the client service.

17. The apparatus according to claim 16, wherein
the processor is further configured to
send a slot information switch request (CR) to a receive end, wherein the CR is used to indicate that the FlexE slot switches from a first quantity of FlexE subslots to a second quantity of FlexE subslots; and
receive a slot information switch acknowledgment message (CA) returned by the receive end, wherein the CA is used to indicate that the FlexE slot is allowed to switch from the first quantity of FlexE subslots to the second quantity of FlexE subslots.

* * * * *